United States Patent [19]

Stiner

[11] 4,266,739
[45] May 12, 1981

[54] CLIP FOR FISHING REEL

[75] Inventor: Roy E. Stiner, Tulsa, Okla.

[73] Assignee: Brunswick Corporation, Skokie, Ill.

[21] Appl. No.: 118,749

[22] Filed: Feb. 5, 1980

Related U.S. Application Data

[63] Continuation of Ser. No. 932,464, Aug. 10, 1978, abandoned.

[51] Int. Cl.³ .............................................. A01K 89/01
[52] U.S. Cl. ............................................. 242/84.21 R
[58] Field of Search ................. 242/84.21 R, 84.21 A, 242/84.2 R, 84.5 A, 84.51 A

[56] References Cited

U.S. PATENT DOCUMENTS

| 2,891,738 | 6/1959 | Chapin | 242/84.21 R |
| 3,085,766 | 4/1963 | Salmivuori | 242/84.21 A |
| 3,900,167 | 8/1975 | Hull | 242/84.5 A |

Primary Examiner—Billy S. Taylor
Attorney, Agent, or Firm—John G. Heimovics; William G. Lawler, Jr.

[57] ABSTRACT

This invention comprehends a unique dual C-shaped retainer clip. This clip is advantageously applied to the shaft of a spinning style fishing reel in order to lock the slider to the shaft.

2 Claims, 7 Drawing Figures

CLIP FOR FISHING REEL

This is a continuation, of application Ser. No. 932,464, filed on Aug. 10, 1978, and copending herewith, and now abandoned.

BACKGROUND OF THE INVENTION

1. Field of the Invention

This invention relates to spinning style fishing reels, and more particularly, to a unique dual C-shaped clip that is utilized within the fishing reel to tightly couple one part to another.

2. Background of the Prior Art

It is well known in the prior art to use C-shaped spring clips such as those manufactured by Truarc Manufacturing Company and commonly referred to as "snap-rings." One of the major drawbacks of utilizing these small C-shaped spring clips is that they are difficult to apply to small grooves. Further they are also difficult to remove since they tend to "pop-off" and are then difficult to find. Many a mechanic is aware that these particular C-shaped spring clips at times "cause more trouble than they are worth." In utilizing this type of C-shaped spring clip in fishing reels, the problem is even more magnified since the fisherman does not normally have the tools readily available to remove the spring clip. When he utilizes a pliers or knife to remove it, the clip usually "pops off" somewhere where he can't find it thereby rendering the fishing reel unusuable. The prior art has failed to teach an easy means for using the spring style clips whereby they are easy to handle and are not easily lost.

SUMMARY OF THE INVENTION

This invention relates to fishing reels, and more particularly, to a unique dual spring clip washer arrangement designed to be utilized in place of single spring clips within a fishing reel.

It is therefore an object of this invention to provide a dual C-shaped spring clip that can be utilized in a fishing reel.

Another object of this invention is to provide such a dual C-shaped spring clip wherein a tie bar between the C-shaped clips determines the spacing of the grooves to which the clip will be inserted.

The above and other and further objects and features will be more readily understood by reference to the following detailed description and the accompanying drawings.

DESCRIPTION OF THE PREFERRED EMBODIMENTS

Figure 1:
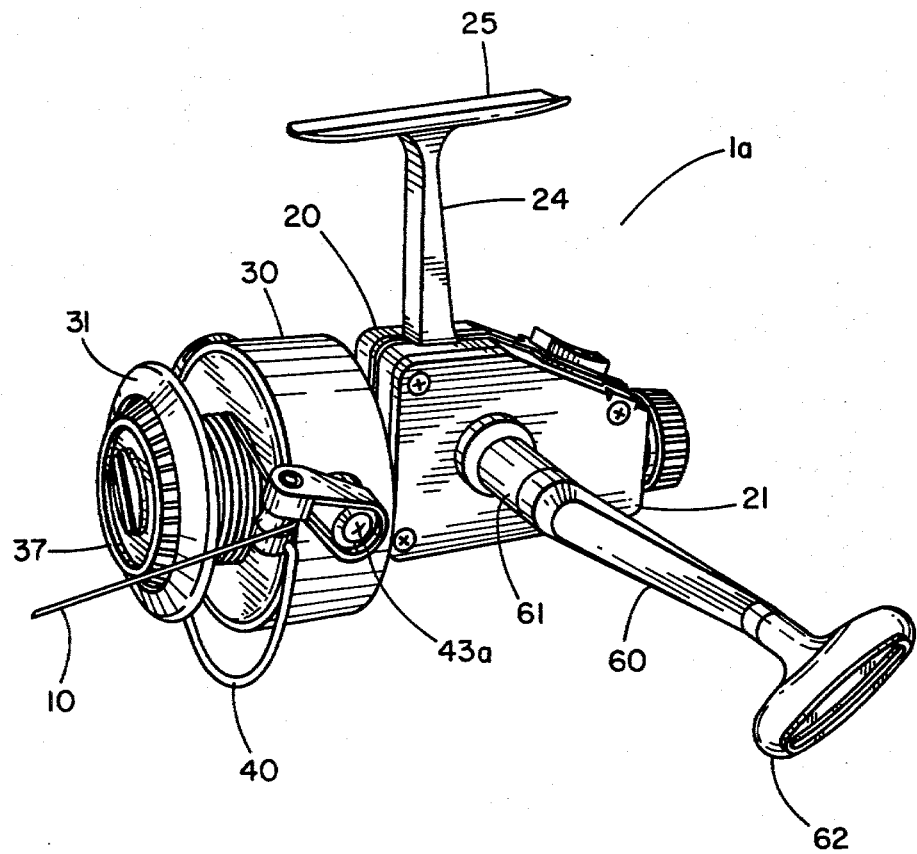
FIG. 1 is a perspective view of the conventional style spinning reel containing the invention described herein.
Figure 2:
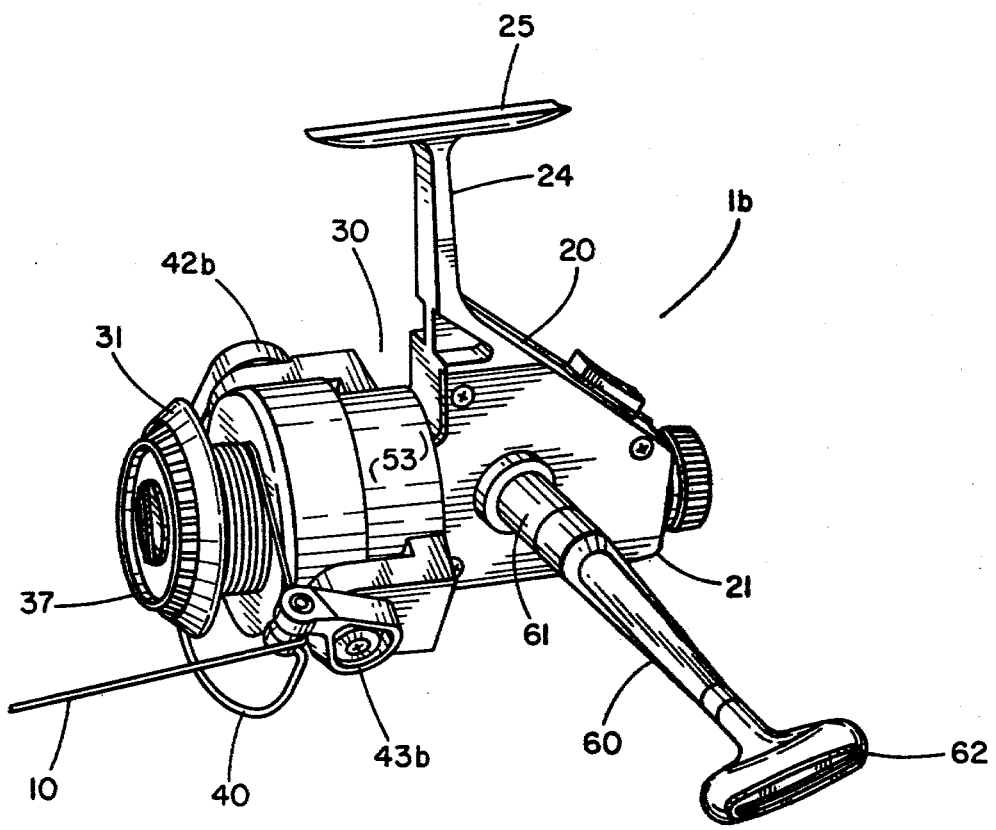
FIG. 2 is a perspective view of the skirted style spinning reel containing the invention described herein.
Figure 3:
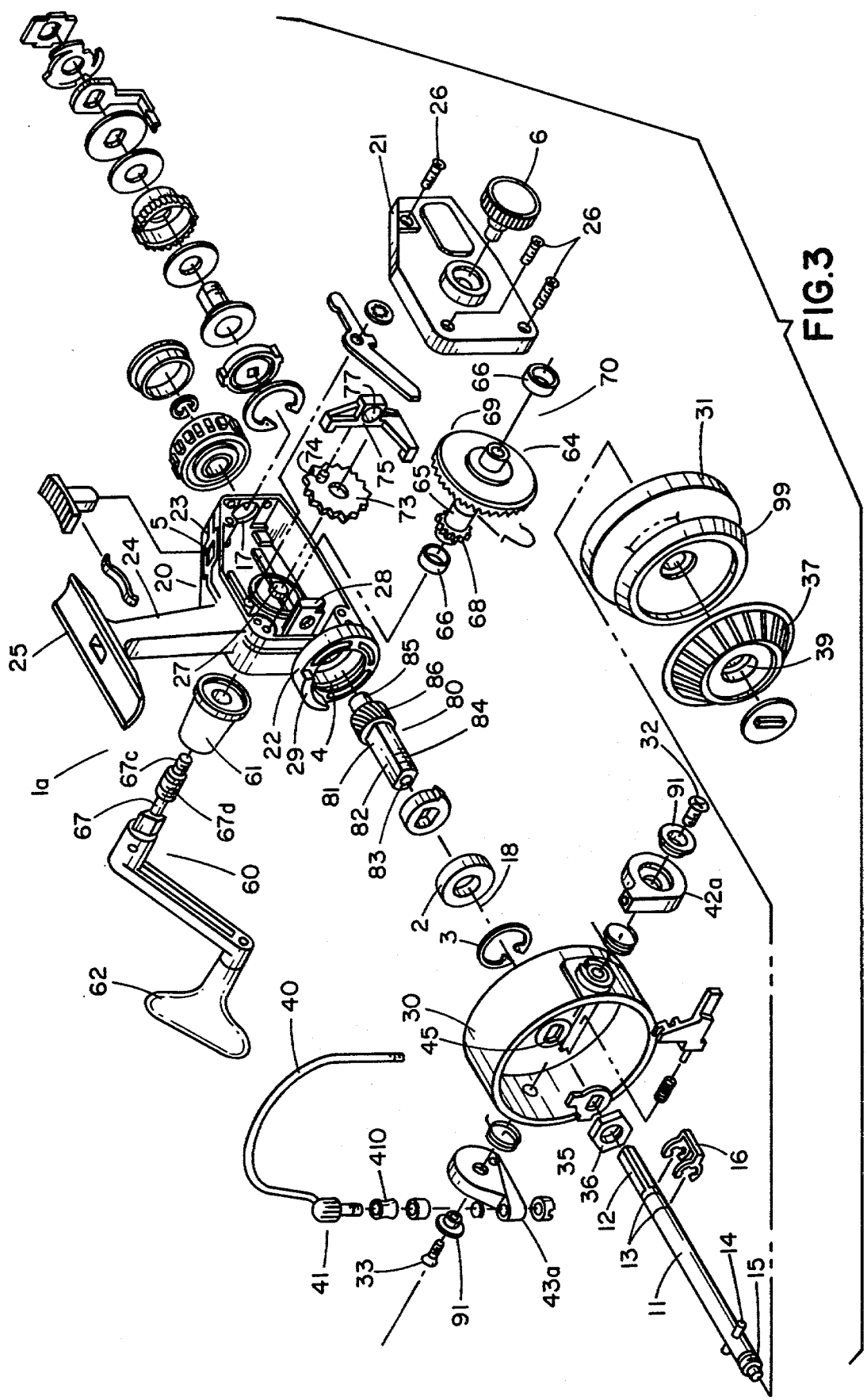
FIG. 3 is an exploded perspective view of the conventional style spinning reel containing the invention described herein.
Figure 4:
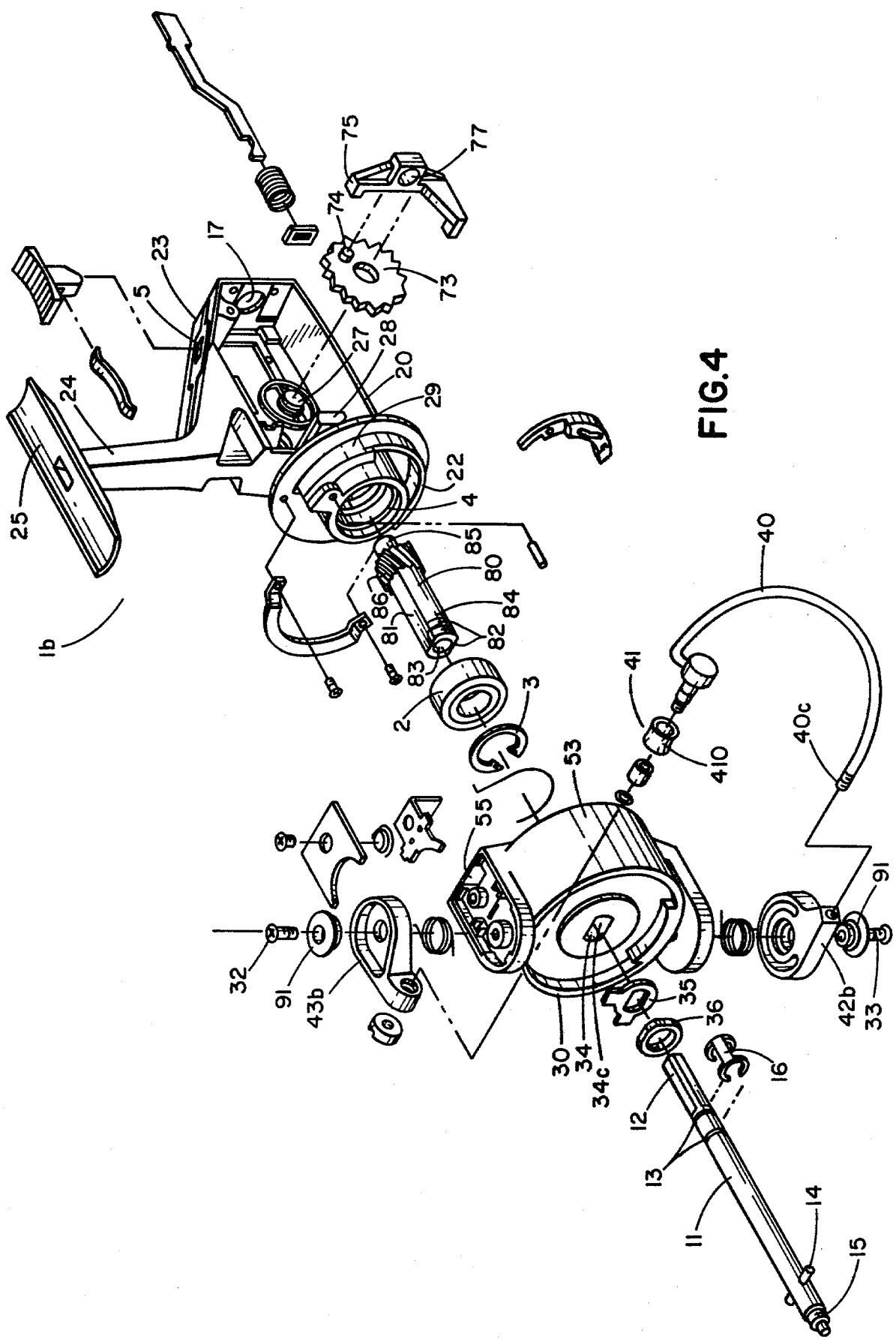
FIG. 4 is an exploded perspective view of the skirted style spinning reel not depicting some of the parts in common with the conventional reel shown in FIG. 3 but capable of incorporating the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 62 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, 2, 5 and 6, the bail 40 is shown in the "closed," "retrieve," or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on the stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15. The shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

Figure 5:
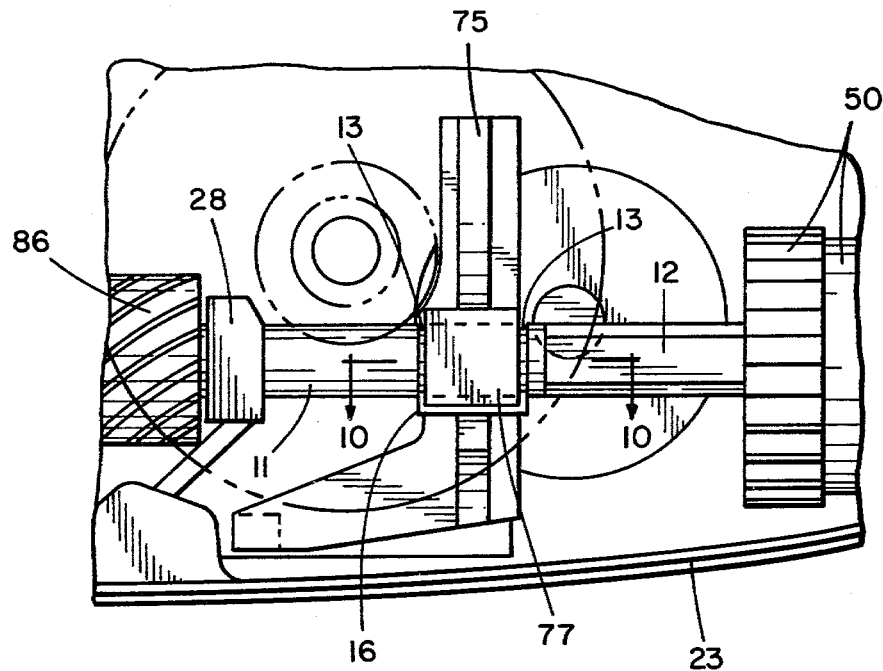
FIG. 5 is a partial cutaway cross sectional view of the gear case of the fishing reel containing an embodiment of the invention.
Figure 6:
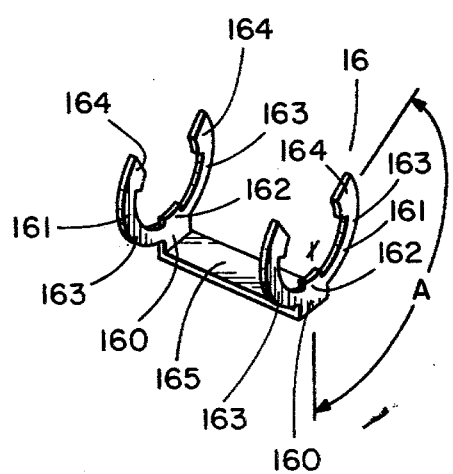
FIG. 6 is a perspective view of an embodiment of the invention.
Figure 7:
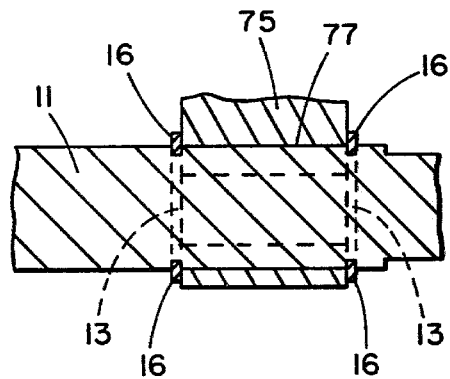
FIG. 7 is a partial cutaway cross sectional view taken from FIG. 5 of an embodiment of the invention.

In a preferred embodiment of the invention a special retainer clip 16 is made from resilient material such as spring steel, spring brass or other spring quality metal. The clip 16 has two C-shaped washers 161 that each have a center bar support 160, an interior center lug 162 and a pair of curved legs 163. The legs 163 are resilient or biasable (springy) and terminate in lugs 164. Tie bar 165 connects the base supports 160 together. The center lug 162 is spaced at arc "A" from the lug 164. The shaft 11 has grooves 13 that have about the same diameter as the three lugs 162 and 164 and the distance between the grooves 13 is the same as the length of the tie bar 165. As may be seen in FIG. 7, the width of the slider 75 at the hole 77 is slightly less than the distance between the grooves 13 or the washers 161. The arc "A" is greater than 90° thus the arc between the two lugs 164 is greater than 180° thus providing the gripping action to slide over a groove of similar diameter and lock thereto. Therefore, the clip 16 can be inserted into the grooves 13 thereby locking the slider 75 to the shaft 11. The tie bar 165 of the unique clip 16 makes it possible to easily remove the clip 16 when desired. It is much easier to handle a single dual clip 16 than two individual spring type C-shaped washers that usually "pop off" and cannot later be found. Preferably, clip 16 is attached to the shaft 11 as shown in FIGS. 5 and 7 to provide better operation of the fishing reel 1a or 1b.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Although specific embodiments of the invention have been described, many modifications and changes may be made in the fishing reel without departing from the spirit and scope of the invention as defined in the appended claims.

What is claimed is:

1. A retaining clip for attachment to a shaft having spaced undercut grooves, the clip comprising:
   (a) a pair of C-shaped washers, each washer having a pair of resilient bifurcated spring legs and a central base support located near the interior center of the C-shape and supports at the interior terminuses of the legs of the C-shape, each leg being biasably positioned with respect to the base support, the terminus of each leg extending circumferentially more that 90° from the central support; and,
   (c) a resilient tie bar connecting the washers near the central base supports and at the exterior thereof, the resilient tie bar permits the individual positioning of each C-shaped washer into the undercut groove with the terminuses and the base support in substantial contact with the grooves.

2. In an open face spinning reel used for casting a bait attached to a fishing line and for retrieving the bait and fishing line after casting, the reel having a housing, a center shaft mounted in the housing, a spool mounted on the shaft for holding the fishing line, a handle and gear train assembly including an oscillator gear mounted in the housing, a rotor coaxially mounted on the shaft and rotatable by cooperative movement of the handle and assembly, and a moveable bail mounted on the rotor having an open casting position and a closed retrieving position, an oscillator slider pin driven by the oscillator gear, and having a support with a hole which the shaft passes therethrough, the shaft having two undercut grooves positioned on each side of the slider support, a retainer clip for securing the shaft and the slider together comprising:
   (a) a pair of C-shaped washers, each washer having a pair of resilient bifurcated spring legs and a central base support located near the interior center of the C-shape and supports at the interior terminuses of the C-shape, each leg being biasably positioned with respect to the base support, the terminus of each leg extending circumferentially more than 90° from the central support; and,
   (b) a resilient tie bar connecting the washers near the central base supports and at the exterior thereof, the resilient tie bar permits individually positioning the C-shaped washers into the undercut groove with the terminuses and the base support in contact with the grooves.

* * * * *